United States Patent [19]

Stager et al.

[11] 3,800,977
[45] Apr. 2, 1974

[54] BIO-DEGRADABLE CONTAINER

[75] Inventors: Francis W. Stager; Robert N. Minor, both of Stafford Springs, Conn.

[73] Assignee: Biocor Corporation, Stafford Springs, Conn.

[22] Filed: Mar. 6, 1972

[21] Appl. No.: 232,200

Related U.S. Application Data

[63] Continuation-in-part of Ser. No. 42,010, June 1, 1970, Pat. No. 3,647,111.

[52] U.S. Cl.................. 220/83, 99/181 R, 117/33, 117/94, 117/95, 117/161 R, 161/257, 161/182, 161/265, 220/63 R, 220/DIG. 30, 229/3.5 R

[51] Int. Cl... B65d 25/34, B65d 25/14, B32b 27/42

[58] Field of Search.......... 161/257; 117/33, 94, 95; 215/1 R, 1 C; 220/83, 63 R; 229/3.5 R, 4.5; 260/19 R, 14, 38; 264/109, 122; 47/37; 99/181 R, 181 C

[56] References Cited
UNITED STATES PATENTS

| | | | |
|---|---|---|---|
| 3,415,402 | 12/1968 | Webber | 215/1 C |
| 1,571,447 | 2/1926 | Huxham | 260/19 R |
| 3,102,364 | 9/1963 | Pullen | 47/37 |
| 3,654,064 | 4/1972 | Laumann | 229/3.5 R |

Primary Examiner—George F. Lesmes
Assistant Examiner—George F. Thibodeau

[57] ABSTRACT

A container which deteriorates after a prolonged exposure to moisture and oxygen in an atmospheric environment with the aid of biological agents. The container material is formed in a laminated configuration and has organic components that ate nutrients to fungi and various bacteria which brings about the decomposition. The material is composed of an organic filler material, such as peat, and a phenolic resin impregnated with a metallic salt of a fatty acid. The decomposition process transforms the container material into a rich organic substance which enhances soil characteristics.

20 Claims, 3 Drawing Figures

PATENTED APR 2 1974   3,800,977

BIO-DEGRADABLE CONTAINER

CROSS REFERENCE TO RELATED APPLICATIONS

This application is a continuation-in-part of U.S. application Ser. No. 42,010 for Bio-Degradable Container filed June 1, 1970 now U.S. Pat. No. 3,647,111.

BACKGROUND OF THE INVENTION

1. Field of the Invention

This invention relates to the field of degradable materials and more particularly to container materials which decompose with the aid of biological agents after prolonged exposure to the atmospheric environment.

2. Description of the Prior Art

A problem which is becoming more severe, particularly in heavily populated areas, is the disposal of waste materials. Large quantities of waste material are discarded daily and greatly tax disposal facilities, frequently to the straining point. Land available for dumping of trash and garbage has become more critical as other, more profitable uses for the land evolve. Furthermore, only selected sites may be employed as disposal areas so that the remaining land may be preserved either in a natural state or in a pleasant environment for both business and residential uses.

The burning of litter poses a similar problem to disposal authorities because of ecological considerations. Air pollution around larger cities is a serious problem which is being attacked from many sides. In addition, pollution of other natural bodies such as rivers and streams may convert common items such as swimming and drinking water, currently taken for granted, into scarce resources.

Quite aside from the disposal problem, many natural spots of beauty are defaced daily by thoughtless depositing of litter along roadsides and in public recreation areas and parks. This litter usually consists of bottles and cans made from glass and aluminum which will never decompose. Costly pickup programs of municpal and state highway departments are inaugurated to eliminate such litter.

In conjunction with the foregoing problems, the field of decomposable materials has recently taken on new interest. While the more urgent need for a disposable material has been generated by current problems, disposable materials themselves are not entirely new. U.S. Pat. No. 2,982,394 discloses a material which decomposes in water. The material is employed for dispensing soil conditioning agents by packaging the agents in the decomposable material and allowing the dampness of the soil to deteriorate the material.

A container which breaks down upon exposure to normal atmospheric conditions is disclosed in U.S. Pat. No. 3,415,402. This container is composed of selected chemicals which react with one another to dissolve the remaining materials following the breakdown of an outer protective coating.

U.S. Pat. No. 3,232,865 employs bacterial agents to purify waste water. While this patent is not concerned with decomposable materials, it does pertain to the field of ecology and is of interest with respect to the present invention due to its use of bacterial agents.

While materials which do decompose are known, such materials frequently breakdown by compound changes or interactions of the components themselves. Plastics, for example, break down upon exposure to sunlight and other environmental factors. It is accordingly an object of the present invention to disclose a material which decomposes without an interaction of the container materials themselves.

It is an object of the present invention to disclose a material which withstands temporary, although complete, submersion in water, but breaks down after prolonged exposure to water and oxygen.

It is also an object of the present invention to disclose a bio-degradable material that breaks down through the aid of fungi and bacterial agents which occur naturally throughout our environment in the presence of oxygen and water.

It is still a further object of the present invention to disclose a compound which forms a rich soil-improving material upon prolonged exposure to natural atmospheric conditions.

SUMMARY OF THE INVENTION

The bio-degradable material of the present invention is comprised basically of an organic filler material, a phenolic resin without fungicidal agents and a metallic salt of a fatty acid which forms a bacterial and fungi nutrient. The organic filler material may be peat, wood flour, cotton, linen or other organic material which has a fibrous character that provides structural definition when combined with the phenolic resin. The metallic salt of a fatty acid, such as zinc stearate, calcium stearate or other metallic salts are usually added as stoppers or fixers to the phenolic resin. The salts affect the flow characteristics and add to the knitting and wetting properties of the compound. The material may be formed in an integral core as shown at core 20 of U.S. application Ser. No. 41,010 and now U.S. Pat. No. 3,647,111. However, as disclosed herein, the material is formed in a laminate having a center layer of an organic material sandwiched between outer layers composed of resin organic filler, and a metallic salt of a fatty acid. The center layer expands upon exposure to environmental moisture, thus tending to crack the other layers. Also, in excess quantities, the stearates bleed to the surface of the outer layers and form fatty acids on which bacteria and fungi feed. The action of the fungi and bacteria cause the material to decompose and the organic materials enhances the decomposition process by forming a rich organic substance in the process.

The bio-degradable laminated material can be molded in the form of a container. The exterior surface of the container is protected by a thin coat of lithographed, water soluble paint and the interior surface, with a coat of plastic, metal flash or wax, commonly used in beverage and food containers. The protective coats temporarily impede the decomposition process until a prolonged exposure to high humidity or water removes the exterior coat and/or causes expansion of the center layer of organic material to crack the outer layers of the laminate and the protective coats. Once the outer protective coat has been broken down, the stearates of the fatty acid bleed to the surface of the core material. The hydrolyzed stearates and oxidized aldehydes from the phenolic resin form biological nutrients. Fungi and bacteria feeding on the nutrients complete the decomposition process by turning the organic filler material into a healty soil conditioner.

In the integral core embodiment of application Ser. No. 42,010, the composition of the bio-degradable material is principally the organic filler material which comprises between 85-95 percent by volume of the material. The metallic salts of the fatty acid range between 2-6 percent by volume, and the phenol formaldehyde binder or resin which holds the material together forms between 3-8 percent by volume of the material. The bio-degradable material is made by blending all three components. The precise container structure is formed in a mold and the mixture is poured and pressed into the mold at pressures in the range of 2,000-6,500 psi. The curing process depends on the particular resin employed and the thickness of the cross section to be cured. Normally, the temperature range lies between 325°-425°F. The molding time at the curing temperature is brief and in the range of 45-120 seconds. Mold charge and closing times should be regulated to obtain material densities ranging from 0.75-0.95 gm/cc. These densities directly effect moisture absorption rate.

In the laminated configuration of this invention, the center layer of organic material may be just an organic filler such as peat, wood flour or other fibrous material, and may contain a supplemental nutrient. The outer layers of the laminated material are preferably formed from the compounds set forth hereinabove, i.e., compounds of an organic filler, a phenolic resin without fungicidal agents, and a metallic salt of a fatty acid within the ranges for such constituents as set forth herein. Alternatively, the center layer may also be formed from a compound of organic filler, phenolic resin without fungicidal agents, and a metallic salt of a fatty acid.

The laminated material is molded to desired shape, with the thickness of the inner and both outer layers being selected in accordance with the particular requirements of the container to be formed. The characteristics of the outer layers, which may be referred to as a skin, can vary as a function of mold temperature, closing times, and other processing characteristics.

After formation, the laminated material is provided with exterior and interior coatings as described above with respect to the integral core material previously described. The outer or skin layers form a hard skin for the bio-degradable laminate, to provide structural strength to the laminated sheet. Nevertheless, the laminated material breaks down and decomposes, in the manner described with respect to the integral core, upon exposure to oxygen and moisture.

BRIEF DESCRIPTION OF THE DRAWINGS

The present invention may be better understood by reference to the accompanying drawings wherein like elements are numbered alike.

DESCRIPTION OF THE PREFERRED EMBODIMENTS

Figure 1:
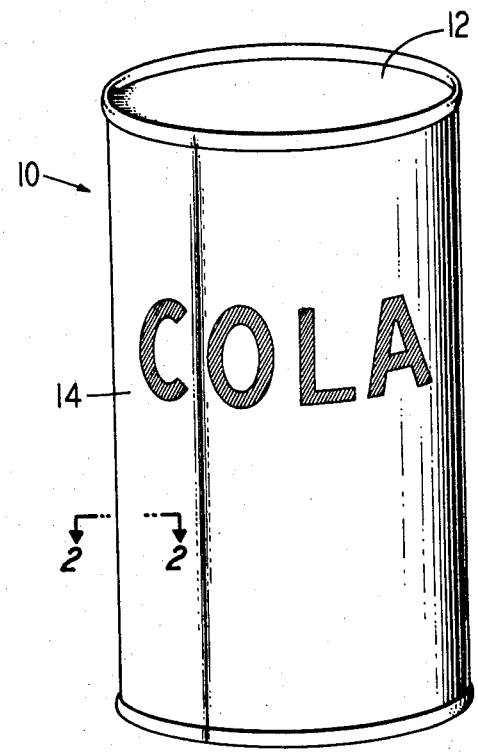
FIG. 1 shows a container of the type which may be constructed with the novel bio-degradable material.

A typical container of the type which would be formed by the novel bio-degradable material is shown in FIG. 1. Such container, generally designated 10, may be used for transporting food or beverages in much the same manner as aluminum or tincoated steel cans are currently employed. The container 10 is molded as described hereinafter and may take any desired shape that can be formed in a mold, such a pure cylindrical form or more fancy rounded, elliptical and irregular forms. The top of the container 12 is sealed to the body 14 to protect the contents of the can under normal dry storage conditions. The seal between the top 12 and the body 14 could be provided by an elastic lip around the periphery of the top 12 or by a fibrous gasket which engages the circular end surfaces of the body 14 in much the same manner as metallic caps are sealed with glass food containers.

The top 12 and the body 14 of the container may be manufactured from the bio-degradable material. The container is made from a laminated structure 16 which has an interior protective coat 18, a core 20 formed from the bio-degradable material and an exterior protective coat 22.

The interior protective coat 18 separates the contents of the can from the bio-degradable material and acts as a protective sealant for the contents. Such material is currently employed in food containers and may take the form of a thin plastic liner, such as polyethylene, a metal flash, such as tin, or a very thin layer of wax. The protective coat 18 may not itself be readily decomposable; however, the coat 18 is extremely thin since it does not perform a significant structural function within the laminated structure 16. Because of its very thin characteristics, normal atmospheric conditions will break down the material with little or not residue.

The exterior protective coat 22 is made for appearance purposes as well as the protective function. The coat 22 may be made from a water soluble paint which is lithographed onto the external surface of the container after molding. Paints of this type are readily available and in one form are known as water base latex paints. While the paint is water soluble, the paint resists deterioration when exposed to water or humidity for short periods of time. Temporary, although complete, submersion in water will have little residual effect on the containers and prolonged storage in a dry environment will not result in a breakdown of the paint.

The bio-degradable core material 20 provides structural rigidity for the laminate structure 16 and any container manufactured from the material. The material is composed of three basic constituents, an organic filler material, a metallic salt of a fatty acid and a binder or resin.

The organic filler material is any fibrous organic material such as peat, wood flour, cotton or linen. Composites of various organic materials may also be employed. The fibrous nature of the organic filler permits the resin to join the various components together in a mixture having sufficient strength to withstand the normal handling expected of food containers. Upon decomposition by the biological agents, the fillers are converted to a rich humus which enhances soil characteristics.

The resin which binds the several components of the degradable material together is an A or B type phenol formaldehyde resin of either a single or two-stage variety available from suppliers such as Hooker Chemical Co. The terms single or twostage refer to the characteristics of the materials formed. The one stage or resol type phenolic resin can completely polymerize upon heating. The two-stage or novalak resins require additional aldehyde or cross linking agents such as hexamethylenetetramine to cure when heated. While most phenolic resins that are used in the molding processes today have fungicidal agents added to prevent fungal and bacterial growth, these additives are not employed in the phenolic resin of the prevent invention. Instead, the growth of bacteria and fungi is encouraged to aid in the decomposition process.

To further encourage the biological decomposition, metallic salts of fatty acids, for example salts from the stearate group such as calcium stearate, cadmium stearate, zinc stearate are added to the resin in excessive amounts. These stearate compounds are normally used in lesser amounts to stop or fix the curing process of the phenolic. By addition of greater amounts of the stearates to the resin, greater amounts of the stearates will bloom on the surface of the core material due to a bleeding effect of the resins. As the stearates come to the surface of the core material, they are hydrolized by emulsifying with water and form fatty acid emulsions characterized by the particular alkyl radical, that is the stearates are converted into stearic acid. The fatty acid may also be formed by the aldehydes in the resin which are oxidized at the surface of the core material. Such fatty acids are the nutrients on which many fungi and bacteria are nourished.

Further additives may be employed to provide a favorable environment for bacterial growth. These additives may include nitrogeneous materials such as ammonium nitrate from which the organisms and fungus derive nitrogen. The acidity of the mixture may also be increased by the addition of tannic acid. The increased acidity stimulates the fungus development in the decomposition process. Breakdown of the core material may be accelerated by the addition of aluminum sulfate to the base mixture shortly before it is molded and enclosed with the protective inner and outer coatings.

Since the principal portion of the core material is organic, bacteria and fungi which are nourished by the fatty acids may thrive on the organic material and convert such organic material into a soil-enriching humus after moisture and sunlight have broken away the exterior protective coat 22 and exposed the decomposable core 20. The phenolic resin without a fungicidal agent encourages the growth of biological agents. The cooperative action of the resin and the metallic salt which forms the fatty acid, a biological nutrient, favors the multiplication of biological agents which in turn change the organic matter into a soil-enhancing humus. Two advantages are therefore immediately apparent. The container from which the bio-degradable material is formed disappears and also the soil upon which the container lies is enriched.

The formation of the bio-degradable container material is accomplished by first mixing the material and then curing the material in a heated mold.

In mixing the bio-degradable material, the three principal constituents are first thoroughly mixed in dry form. If the resin is a liquid, the metallic salts of the fatty acids such as stearates are added to the resin in appropriate amounts and the organic filler material in dry form is then blended with the liquid resin.

The range of compositions of the constituents can be varied according to the desired characteristics of the container such as strength, rate or decomposition and manufacturing economy. For example, if the considerations of strength are foremost, the percent or organic filler material will be of principal interest. On the other hand, where the rate of decomposition is the more critical parameter, the quantity of the component which forms the fatty acids will be controlling. In general, the ranges of the constituents would be as follows: the phenolic resin may form between 3-8 percent by volume of the blended mixture; the metallic salt of the fatty acid would be approximately 2-6 percent by volume of the mixture and the remainder of the material, that is approximately 85-95 percent by volume, would be organic material with incidental impurities.

Once the blended mixture has been formed, it is placed in a mold having the contours of a particular container. In the case of a pressure molding process, the mixture would be formed at a pressure between 2,000psi-6,500psi. If the particular resin requires heat for curing, the mold may be provided with a heating jacket or electrical heating coils. The curing temperature varies according to the resin and the particular wall thickness of the part. Normally the phenolic resins are cured in a range between 325°-425°F and the molding time extends between 45-120 seconds. Mold charge and closing times should be regulated to obtain densities in the finished article in the range of 0.75-0.95 gm/cc. The density of the article is important because it directly affects the moisture absorption rate from the surrounding environment.

Once the bio-degradable material has been molded in the shape of a container, it is then coated internally and externally. Internally, a liner of wax, metal flash, or plastic is applied. It is also possible to suspend a loose liner such as a thin polyethylene sack from the lip of the container. Externally, a thin coating of water soluble paint is applied by standard lithographic processes. The paint improves the appearance of the container and also provides identifying or advertising information. The water solubility of the paint may be varied. Complete although temporary submersion of the container should not allow immediate deterioration of the coating. The solubility of the paint should allow the finished container to be stored in a low humidity environment for extended storage periods. It is also feasible that in instances where prolonged storage in a damp environment is contemplated, a more permanent, nonsoluble coating may be applied which nevertheless would deteriorate in a natural atmospheric environment. Such thin coating, while not decomposable, may be satisfactory since the principal portion of the container, the structural core material, is decomposable and very little residue from the coating would be expected.

Tests on specific examples of the novel bio-degradable core material have been conducted to determine their suitability and rate of deterioration. A synopsis of a few of the examples tested follows:

EXAMPLE I

In this example the core mixture was composed of 5 percent by volume of phenolic A type resin, 3 percent by volume zinc stearate and the remainder being the organic material, in this case peat. The mixture was formed in a wafer under a molding pressure of approximately 6,500 psi and held at a mold curing temperature of approximately 375°–400°F for one and a half minutes. The thickness of the resulting wafer was 0.093 inches.

EXAMPLE II

In this case, a phenolic B type resin was mixed with zinc stearate and peat. The percentages by volume were 3 percent for the resin, 5 percent for the stearate and approximately 90 percent peat. To this mixture a small amount of aluminum sulfate, approximately 2 percent by volume, was added to encourage material break down. Again a molding pressure of 6,500 psi and mold curing temperatures within the range of 375°F–400°F were employed for approximately one and a half minutes.

EXAMPLE III

In this example, the quantity of zinc stearate was reduced to 2 percent by volume and the A type phenolic resin was employed in an amount approximately 3 percent by volume of the total mixture. Ammonium nitrate in the order of 5 percent by volume was added to furnish a nitrogen component which would encourage fungal growth. The remaining portion of the example consisted of organic peat material and was formed according to the same molding and curing parameters mentioned with respect to examples I and II.

EXAMPLE IV

The composition consisted of approximately 4 percent A-type phenolic resin, 5 percent zinc stearate and 90 percent peat. Tannic acid, approximately 1 percent by volume, was added to increase the acidity of the molded wafer. Molding was accomplished at approximately 6,300 psi and the curing time was approximately one minute.

EXAMPLE V

In this example the phenolic B-type resin formed only 2 percent of the mixture while the zinc stearate component was increased to 6 percent. Organic peat formed approximately 85 percent of the material to which an aluminum sulfate additive, approximately 7 percent by volume, was injected prior to molding according to the same parameters as in Example I.

EXAMPLE VI

In this example, the basic organic matter was wood flour and composed approximately 90 percent of the material. Phenolic resin A at approximately 3 percent by volume was combined with an equal percentage of a stearate in this instance, calcium stearate rather than zinc stearate. To this mixture ammonium nitrate was added to form approximately 4 percent by volume of the molded material. Again, molding and curing were as described in Example I.

EXAMPLE VII

To a mixture of 5 percent by volume phenolic resin B, 2 percent cadmium stearate and 85 percent peat, tannic acid was added to form the balance of the mixture. The molding process was carried out at approximately 6,300 psi for one minute.

In each of the above examples, the core material took the shape of a wafer in its molded state. These wafers were then placed in a dark environment which was held at 60°F–70°F. The relative humidity of the environment fluctuated between 40 percent and 100 percent. In each case, contamination, that is initial signs of fungus growth, were noted within two weeks which indicated that the decomposition process had indeed begun.

Figure 2:
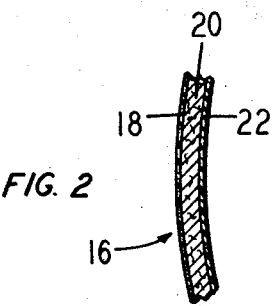
FIG. 2 is a partial cross-sectional view of the container shown in FIG. 1 as seen along the section line 2—2.
Figure 3:
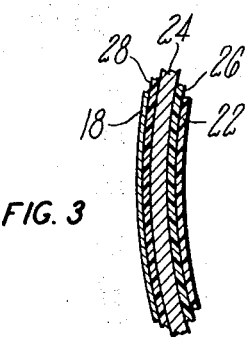
FIG. 3 is a partial cross-section of the laminated core configuration of this invention, also along line 2—2 of FIG. 1.

Referring now to FIG. 3, the laminated configuration of this invention is shown. In this embodiment, the core material, rather than being the integral core as shown in FIG. 2, is a laminated core having a center layer 24 to which are laminated outer or skin layers 26 and 28. As with the FIG. 2 embodiment, an outer protective coat 18 and an inner protective coat 22. In the FIG. 3 embodiment, the center layer 24 and skin layers 26 and 28 form a laminated biodegradable core between the protective coats 18 and 22.

Central layer 24 is preferably just an organic filler material, such as peat or wood flour or fibrous materials which compresses on molding and expands on the absorption of water to provide expansive forces for cracking the laminated core. The center layer 24 may also be supplemented with a nutrient such as sugar, dextrose, or a nitrogen compound to enhance fungicidal action and bio-degradability.

Alternatively, but less preferred, the central layer 24 may be formed from a compound such as that disclosed herein for integral core 20.

The skin layers 26 and 28 are each formed from a molded sheet of a compound of phenol formaldehyde resin, a metallic salt of a fatty acid, and a filler. Additives such as aluminum sulfate may also be included. While these skin layers may be formed from the compounds set forth with respect to integral core 20, it is preferred that they be formed from a compound having from 45 to 95 percent (by weight) wood flour as filler, from 3 percent to 50 percent (by weight) phenol formaldehyde resin, from 2 to 9 percent (by weight) zinc stearate, and from 0 to 26 percent (by eight) aluminum sulfate. The skin layers 26 and 28 form a thin hard skin.

The laminated structure of FIG. 3 can be formed in the same general manner as set forth with respect to the FIG. 2 embodiment in regard to molding times and temperatures, although curing time may extend up to 5 minutes or more.

Still referring to the FIG. 3 embodiment and a container formed therefrom, the core material 24 is highly compressed upon molding, while the thin hard skin layers 26 and 28 impart considerable structural strength to the laminated material. The three layers 24, 26 and 28 are placed in the desired mold, usually in an unbonded state, and then exposed to molding or curing temperatures. The molding temperatures cause some of the resin materials from skins 26 and 28 to bleed inwardly toward the center of core 24 which is absorbent. In this manner a laminate is created where the skins 26 and 28 bond to core 24. The laminate thus formed varies in resin content from a high in skins 26 and 28 to a low or zero level near the center of core 24, and the center of core 24 remains a soft organic center. Coatings 18 and 22 are formed as described for FIG. 2.

Assuming that a container as in FIG. 1 has been formed and is discarded after opening, core 24 is eventually exposed to the environment. This exposure can come about through breakdown of coatings 18 and 22 and skins 26 and 28, or an edge 30 may be exposed such as by cracking of the container or by removal of a covering strip. In any event, when core 24 is exposed to the moisture of the environment it expands and develops very high expansive forces whereby skins 26 and 28 are cracked and broken up from inside. In this way great amounts of surface area of core 24 and skins 26 and 28 are exposed to the atmosphere, and the bio-degradable process is enhanced.

The following examples were prepared by molding cup shaped containers in a mold at 3,000 psi at 325°F for 5 minutes.

EXAMPLE VIII

A core 24 was formed of sheet peat, and skins 26 and 28 were formed from a composition of 34.4 percent (by weight) type B phenolic resin, 37.5 percent wood flour, 2.2 percent zinc stearate, and 25.9 percent aluminum sulfate. The skins were laminated to the core in a cup mold. This sample was placed in a soil box of garden loam and steer manure and kept moist in an atmosphere saturated with water at 28°C with the convex side of the sample immersed in the soil. After 6 weeks the sample was moldy, cracked and discolored, based on visual examination, and further progressive deterioration was noted through a total of 17 weeks.

EXAMPLE IX

A sample was formed as in Example VIII and was placed in the same soil box under the same conditions with an edge immersed to half the diameter of the sample. After six weeks the sample was moldy, cracked and discolored, based on visual examination, and further progressive deterioration was noted through a total of 17 weeks.

EXAMPLE X

A core 24 was formed from a composition of 16.7 percent (by weight) type A resin, 53.4 percent milled peat, 8.7 percent zinc stearate, and 21.2 percent aluminum sulfate. Skins 24 and 26 of the composition set forth in Example VIII were placed around this core, and the sample was molded in the cup shaped mold. This sample was immersed in the same soil box under the same conditions as Example VIII, also with the convex side down. After six weeks the sample was moldy and cracked, and further progressive deterioration was noted through 17 weeks.

EXAMPLE XI

A sample was formed as in Example X and was placed in the same soil box under the same conditions with an edge immersed to half the diameter of the sample. After six weeks the sample was moldy and cracked, based on visual examination, and further progressive deterioration was noted through a total of 17 weeks.

While the novel bio-degradable container material has been described in various embodiments above, it should be understood that substitutions and modifications can be made in the examples given. The particular stearates may be replaced by equivalent metallic salts which generate the fatty acids upon which bacteria and fungi thrive. In addition, other organic materials than those disclosed above can provide the necessary fibrous structure which, in combination with the binder, produces the structural strength required of the finished container. The binder itself is a phenolic resin without the fungicidal agent normally added to impede attack by fungi and bacteria. It will, therefore, be understood that, while a number of specific embodiments have been given, the invention has been described by way of illustration rather than limitation.

What is claimed is:

1. A bio-degradable container comprising:
   a laminated material forming a container, said laminated material having a central core and first and second skins bonded to opposite sides of said core;
   said core having an organic filler material; and
   each of said first and second skins having an organic filler, a metallic salt of a fatty acid, and a binding agent joining the organic filler and the metallic salt of a fatty acid.

2. A bio-degradable container as in claim 1 wherein:
   said organic filler of said core has fibrous character.

3. A bio-degradable container as in claim 1 wherein:
   said organic filler in said skins comprises not more than 95 percent by weight of said skin.

4. A bio-degradable container as in claim 1 including:
   a water soluble protective coating on the outer surface of one of said skins for preserving said container in the absence of a humid environment.

5. A bio-degradable container as in claim 1 wherein:
   said binding agent is a phenol formaldehyde resin essentially free of fungicidal additives.

6. A bio-degradable material comprising:
   a core of an organic substance; and
   first and second skins laminated to opposite sides of said core, each of said skins having:
   a filler material of an organic substance;
   a fatty acid product capable of hydrolyzing to form a biological nutrient; and
   a binder joining the fatty acid product and the filler in a unified form.

7. The bio-degradable material of claim 6 wherein:
   the filler of said core is a fibrous organic substance.

8. The bio-degradable material of claim 7 wherein:
   the organic substance is peat.

9. The bio-degradable material of claim 6 wherein:
   the fatty acid produce is a salt of a fatty acid.

10. The bio-degradable material of claim 9 wherein:
    the salt of a fatty acid is a stearate.

11. The bio-degradable material of claim 10 wherein:
    the salt is a stearate selected from the group consisting of zinc stearate, calcium stearate and cadmium stearate.

12. The bio-degradable material of claim 6 in a molded configuration wherein:
    the organic filler in said skins forms 95 percent by weight of said skins.

13. The material of claim 12 wherein:
    the fatty acid product is a salt of a fatty acid comprising approximately 2–9 percent by weight of the skin.

14. The material of claim 13 wherein:
    the binder is a phenolic resin comprising approximately 3–50 percent by weight of the skin.

15. The bio-degradable material of claim 12 additionally including:
    an organic acid additive in said skins.

16. The bio-degradable material of claim 9 including:

a nitrogeneous fungal nutrient in either said core or said skin.

17. The bio-degradable material of claim 12 additionally including:
aluminum sulfate in said skins in an amount not substantially exceeding 26 percent by weight of the material.

18. The bio-degradable material of claim 6 in the form of a container including:
a protective coating covering the exterior surface of the container form.

19. The bio-degradable material of claim 18 wherein:
the protective coating is a water soluble exterior coating.

20. The bio-degradable material of claim 18 including:
an additional protective coating extending throughout the interior surface of the container form.

* * * * *